United States Patent Office 2,864,809
Patented Dec. 16, 1958

2,864,809

HYDROGENATED POLYBUTADIENE AND PROCESS FOR PRODUCING SAME

Rufus V. Jones and Charles W. Moberly, Bartlesville, Okla., assignors to Phillips Petroleum Company, a corporation of Delaware No Drawing. Application November 30, 1953
Serial No. 395,291

8 Claims. (Cl. 260—85.1)

This invention relates to a new class of thermoplastic materials. In a more specific aspect this invention relates to the catalytic hydrogenation of rubbery polymers of butadiene and to the plastic materials resulting from such hydrogenation.

This application is a continuation-in-part of our prior applications, Serial No. 202,797, filed December 26, 1950, now abandoned, and Serial No. 270,944, filed February 11, 1952, now Patent 2,786,047.

We have discovered that a new class of materials can be produced by hydrogenating rubbery polybutadiene. This hydrogenation is preferablyt carried out in a solvent for the starting material in the presence of a specially prepared nickel-kieselguhr catalyst. The new products of the present invention are characterized by their decreased solubility in many common solvents, their increased tensile strengths, their increased resistance to ozone deterioration, and their lowered degrees of unsaturation when compared to the unhydrogenated polymer. These hydrogenated products are unique in that although they are thermoplastic, they can be vulcanized. The vulcanized products have the properties similar to vulcanized elastomers. An outstanding characteristic of these materials, and the property that makes them especially valuable in combination with the properties set forth above, is their low temperature characteristics. They are flexible at temperatures as low as $-100°$ F. and are not brittle at temperatures approaching $-200°$ C., i. e., at liquid nitrogen temperatures. This property makes them especially valuable for arctic service and for use in aircrafts where plastic materials are subjected to very low temperatures.

Since these materials are thermoplastic they are well suited for the preparation of articles by conventional extrusion or compression molding processes and they can also be processed by conventional compounding and vulcanizing techniques. They can be vulcanized by means of the usual vulcanization agents and compounded and processed by methods known to the art using the usual fillers, plasticizers, tackifiers, softeners, accelerators, retarders, accelerator activators, etc. The new plastics of our invention can be used to make fibers, filaments, dishes, containers, films, sheetings, toys, gaskets, tubing, coating materials, protective coverings, white sidewalls for tires, and the like. They can be rolled into sheets or handled by other methods of the art either before or after compounding. The sheets thus formed can be laminated with laminating material by interposing the material between layers of the sheet stock and forming a laminate by applying sufficient heat and pressure to bond the materials together.

Each of the following objects is obtained by at least one of the aspects of this invention.

It is an object of this invention to provide a new process for hydrogenating rubbery polymers of butadiene.

Another object of this invention is to provide new plastic materials.

Another object of this invention is to provide new vulcanizable materials.

Still another object of this invention is to provide a new process for improving the characteristics of rubbery polymers of butadiene.

Yet another object of this invention is to provide plastic materials having very good low temperature characteristics.

Yet another object of this invention is to provide plastic materials flexible at temperatures below $-100°$ F.

Other objects and advantages of this invention will become apparent to one skilled in the art upon reading this disclosure.

The products of the present invention are prepared by a catalytic hydrogenation procedure. In carrying out the process of our invention we charge a butadiene polymer, substantially free of salts or other materials which might act as hydrogenation catalyst poisons, to a suitable hydrogenation reactor in the form of a solution or dispersion in a suitable solvent. In some instances the polymer dissolves completely, while in other cases a dispersion is formed. This appears to be a function of the particular polymer. The solvent is preferably inert to hydrogenation but this is not an absolute requirement, since unsaturated materials can be used. When aromatic solvents are used they are usually hydrogenated concomitantly with the polymer. In such a case the solvent is frequently recovered and recycled to the hydrogenation process.

Suitable solvents include saturated cyclic hydrocarbons such as cyclohexane, methylcyclohexane, decalin, and the like, preferably boiling above atmospheric temperature. Aromatic hydrocarbons, such as benzene and toluene; cyclic ethers, such as dioxane; and paraffinic hydrocarbons such as isooctanes, isoheptanes, and normal heptane; hydroaromatic hydrocarbons such as tetralin; and the like, can also be used. Mixtures of solvents and/or dispersants can be used if desired.

In one embodiment, after the polymer has been dissolved in the solvent the hydrogenation catalyst is added, hydrogen is added, and the temperature raised to a suitable level to initiate the reaction. This operation can be carried out in a batch-wise or a continuous process. When sufficient hydrogenation has been effected, usually as indicated by a decrease in unsaturation or a drop in hydrogen pressure, the reaction is stopped and the dispersion or solution treated by suitable means, such as by filtering, centrifuging, and the like, to remove the catalyst. The magnetizable catalyst can be removed very advantageously by passing the solution or dispersion after hydrogenation through a packing which has been energized with a high field flux by either permanent or electro-magnets. A suitable device is a tube packed with fine steel wool, fine magnetic rings, fine magnetic screens, etc. on the outside of which are the magnets. Demagnetizing the packing permits removal of the catalyst particles from the packing. A particular form of magnetic separator is disclosed in our copending application Serial No. 270,944, now Patent 2,786,047, of which the present application is a continuation-in-part. Hydrogenated thermoplastic is then separated from the solvent or dispersing medium. Either the catalyst or the solution of polymer can be added in increments after the reaction temperature has been reached.

When the reaction is carried out in a continuous manner, a solution of the polymer containing the catalyst in suspension can be introduced into a tubular reactor and hydrogen introduced into the reaction zone at one or more points. The reaction can also be carried out in a stirred autoclave by continuously introducing the reactants and continuously removing the products.

The polymers used to produce the thermoplastic materials of our invention can be selected from homopolymers of butadiene and copolymers of butadiene and styrene, using not over 30 parts by weight of styrene per 100 parts by weight of monomers. These polymers for use in this invention are prepared by emulsion polymerization, the temperature for the polymerization ranging from −5° F. to 140° F., preferably from 20° F. to 60° F. Polymers of butadiene produced at 41° F. have produced hydrogenated materials with the best balance of properties. Using the emulsion polymerization system, it has been found that approximately 75 to 85 percent of the butadiene polymer is formed as a result of 1–4 addition while 15 to 25 percent of the polymer is formed as a result of 1–2 addition.

Thermoplastics having the best balance of physical properties have been produced from rubbery polymers of butadiene and copolymers of butadiene and styrene, the styrene content limited as set forth above. For the products of our invention the polymer to be hydrogenated should have a Mooney viscosity below 40 (ML–4) measured at 212° F. Where the Mooney viscosity is above 40 it is preferable to mill or otherwise degrade the polymer prior to hydrogenation.

In our work it has been found that the hydrogenation process is simplified and that better products are produced if the polymer is vacuum dried or is dried in the presence of an inert atmosphere at a temperature not above 150° F. Air drying at temperatures around 220° F. has been used but it is not as satisfactory since, in general, the hydrogenation of a polymer so dried does not proceed as rapidly nor to as high degree of saturation when it is air dried at the higher temperature. Thorough washing of the polymer is desirable following coagulation.

Polymers can be recovered by adding a coagulant to a mixture of the latex and a solvent for the polymer. The polymer is recovered as a solution suitable for hydrogenation.

We have tried many hydrogenation catalysts but prefer to use a nickel-kieselguhr catalyst of a particular particle size which has been activated under particular conditions. In application Serial No. 202,797, we listed a series of catalysts including nickel-kieselguhr, Raney nickel, copper chromate, molybdenum sulfide, finely divided platinum, finely divided palladium, platinum oxide, copper chromium oxide, and the like, although it was stated that the nickel-kieselguhr catalyst was to be preferred. Further development work has shown that the nickel-kieselguhr catalyst is far superior to the others which have been tried. Rufert nickel has also been tried but again is inferior to the preferred nickel-kieselguhr catalyst.

Furthermore, it is this nickel-kieselguhr catalyst treated in a particular manner which produces the superior results. We prefer to use a finely divided catalyst having a particle size between 1 to 8 microns which has been activated at a temperature between 500 to 800° F. for a period of several hours by passing hydrogen thereover. A very suitable catalyst which we have used is such a nickel-kieselguhr catalyst treated at 675° F. for four hours using approximately 100 volumes of hydrogen per volume of catalyst. Such a treatment reduces at least a part of the nickel compound to elemental nickel, generally 35 to 40% of the nickel being reduced, but our work has shown that the reduced nickel content is not critical, and may vary from approximately 10 to 50 percent. Since the catalyst is charged on the unreduced basis, the weight of reduced catalyst is calculated and multiplied by the reduced nickel content to obtain the weight of reduced nickel set forth above. In the preparation of the catalyst the reduced nickel content of the catalyst increases with time, temperature, and hydrogen rate. In the hydrogenation of the polymer, 2 to 30 weight percent on the unreduced basis of catalyst based upon the weight of the polymer gives the preferred rate of hydrogenation.

The polymers can be hydrogenated according to the process of this invention and can be produced using the following ranges of reaction conditions. Reaction pressures are preferably in the range from atmospheric to 3000 p. s. i. g., the usual range being within 100 to 1000 p. s. i. g. The temperature can range from 75° F. up to the degradation temperature of the polymer, maximum temperatures ranging as high as 700 to 1000° F. The preferred range is between 300 and 600° F. Degradation has not been noted even when hydrogenation was carried out at 600° F. and a pressure of 2500 p. s. i. g., based on intrinsic viscosity tests. Reaction times in the range of 1 to 24 hours, preferably 2 to 8 hours can be employed. In the usual case no further hydrogenation takes place after 2 or 3 hours. The amount of catalyst required is also a function of the temperature of hydrogenation. That is to say, 10 percent by weight of catalyst at 500° F. produces approximately the same effect that 15 percent gives at 400° F.

In order to obtain polymers of the desired characteristics, the unsaturation should be reduced to a value of approximately 0 to 50 percent, based upon the theoretical value of 100 percent for the unhydrogenated butadiene polymer. Preferably the residual unsaturation in the product should be less than 30 percent. The value desired within this preferred range depends upon the use to which the particular hydrogenated material is to be put. If the hydrogenated material is to be vulcanized the residual unsaturation should be within the range of 15 to 30 percent, vulcanization being difficult when the polymer has an unsaturation below 10 and being almost impossible when this value is below 5. Materials having good ozone resistance are produced when the unsaturation is kept below 20 percent, this result being apparent both before and after vulcanization.

Hydrogenated polybutadiene prepared according to the process of our invention is a white, solid material when precipitated from solution, being similar in appearance to asbestos fibers. On molding, the products are colorless and transparent. The hydrogenated products are lighter in color than the unhydrogenated starting material. The hydrogenated polymers are very tough and have greater tensile strength than the starting materials, the tensile strengths being in the range of 750 to 4000 p. s. i., measured on the uncompounded stock at 80° F. and the elongation of these hydrogenated materials is greater than 500 percent.

Further evidence of the low temperature properties of these hydrogenated polymers is seen in their second order transition temperatures, sometimes referred to as the glassy state transition. The second order transition temperature of polybutadiene rubber is −94° F. The second order transition temperature of hydrogenated polybutadiene is below −256° F., no evidence of a glassy state transition being observed down to this temperature.

Following are examples of the product and process of our invention. It is to be understood that the materials, quantities, temperatures, pressures, etc., set forth are for the purpose of illustration and should not be construed as unduly limiting the invention. Of course, ranges outside the limits set forth above can be used. For instance, polymers of higher Mooney values, say up to 60, can be hydrogenated and a considerable excess of catalyst can be used, even as much as an amount equal in weight to the polymer. However, the stated ranges are believed to produce products with the best balance of properties.

EXAMPLE I

Polybutadiene was prepared by emulsion polymerization of butadiene at 41° F. The following recipe was used.

| | Parts by weight |
|---|---|
| Water | 180 |
| Butadiene | 100 |
| Sodium alkaryl sulfonate | 1.5 |
| Diisopropylbenzene hydroperoxide | 0.097 |
| Mercaptan blend [1] | 0.065 |
| KOH | 0.04 |
| $K_4P_2O_7$ | 0.177 |
| $FeSO_4 \cdot 7H_2O$ | 0.14 |

[1] A blend of tertiary $C_{12}$, $C_{14}$ and $C_{16}$ aliphatic mercaptans in a ratio of 3 : 1 : 1 parts by weight.

The polymer had a Mooney viscosity of 29.

This polybutadiene was purified and hydrogenated by the following procedure:

Sixteen grams of polybutadiene in the form of a 3.2 weight percent solution in methylcyclohexane was charged to a hydrogenation reactor along with a reduced nickel on kieselguhr catalyst* and the reactor pressured to 1500 p. s. i. g. with hydrogen. The temperature of the reactor was then slowly raised to 200° F. and maintained at that level for 24 hours. The solution was then filtered to remove catalyst and the product recovered. The product had an unsaturation value of 3.33 percent and had a carbon analysis of 85.24 percent and a hydrogen analysis of 14.05 percent.

EXAMPLE II

Evaluation tests were made on hydrogenated polybutadiene elastomer prepared as follows:

I. The polybutadiene was prepared by emulsion polymerization of butadiene at 122° F. according to the following recipe:

|  | Parts by weight |
|---|---|
| Water | 180 |
| 1,3-butadiene | 100 |
| Potassium fatty acid soap | 4.7 |
| $K_2S_2O_8$ | 0.25 |
| Mixed tertiary mercaptans [1] | 0.51 |
| Hydroquinone (short stop) | 0.2 |

[1] A blend of tertiary $C_{12}$, $C_{14}$ and $C_{16}$ aliphatic mercaptans in a ratio of 3:1:1 parts by weight.

Product from 2 runs (as above) was blended to give a 26 Mooney viscosity polybutadiene which was hydrogenated as follows:

228 grams of polybutadiene dispersed in 400 cc. of methylcyclohexane and 500 cc. of reduced nickel-kieselguhr catalyst dispersion† was added. This dispersion was placed in a hydrogenation reactor and pressured to 1425 p. s. i. g. with hydrogen. The temperature was gradually raised to 300° F. and held at that level for 4 hours. A sample taken at this point had an unsaturation value of 47.4 percent.

500 cc. of fresh catalyst was then added to the reactor and hydrogenation was continued for an additional 4 hours at 300° F. A sample taken at this point had an unsaturation value of 29.8 percent. The hydrogenation mixture was fractionated by adding 25 wt. percent of isopropanol which precipitated a portion of the hydrogenated product as a gelatinous mass. This fraction was separated into a solid portion and a solution by a centrifuge. The solid portion was washed with isopropanol, filtered and dried to give 109 grams of elastomer having an unsaturation value of 7.2 percent. The liquid portion was concentrated, precipitated with isopropanol and dried to give 77 grams of elastomer having an unsaturation value of 53.5 percent.

---

* Ten to 15 grams of nickel hydroxide on kieselguhr catalyst was reduced with hydrogen at 650° F. for 4 hours and quenched with 250 cc. of methylcyclohexane. The resulting suspension was used as the catalyst. The catalyst when completely reduced has a nickel content of 75 weight percent.

† The catalyst was prepared as follows: 60 grams of nickel hydroxide on kieselguhr was reduced with hydrogen at 650° F. for 4 hours and quenched in 500 cc. of methylcyclohexane. This catalyst when completely reduced has a nickel content of 75 weight percent.

The following compounding recipe was used to compound the elastomers:

|  | Parts by weight |
|---|---|
| Elastomer | 100 |
| Titanium dioxide | 50 |
| Zinc oxide | 5 |
| Agerite alba [1] | 1 |
| Stearic acid | 2 |
| TP-90B [2] | 10 |
| Sulfur | 2 |
| Santocure | 1 |
| A-32 [3] | 0.2 |

[1] Hydroquinone monobenzyl ether-antioxidant.
[2] A high molecular weight polyether having the following properties: non-toxic, light-straw to brown-colored liquid with little or no odor; sp. gr. 0.967; V. P. 4 mm., 200° C. and 760 mm. at 660–760° F.; viscosity at 27° C., 8 cps.
[3] Reaction product of butyraldehyde and butylidene aniline.

Samples were cured at 307° F. for 45 minutes and standard test methods were employed in testing the cured samples. Results are given in the following table.

Summary of physical properties
45 Minute Cures

| Sample | Parts TiO2 | 80° F. | | | Shore Hardness | Tear | | Gehman Freeze Point, °C. | Percent Cold Compression Set | Percent Swell | Percent Extraction |
|---|---|---|---|---|---|---|---|---|---|---|---|
|  |  | Modulus | Tensile | Percent Elongation |  | Room Temp. | 150° F. |  |  |  |  |
| Control | 50 |  | 290 | 245 | 35.5 |  | 5 | −80 |  | 204.8 | 6.3 |
| I—7.2% Unsat | 50 | 950 | 1,480 | 480 | 83 | 232 | 85 | −55E | 71.2 | 63.6 | 5.3 |
| II—53.5% Unsat | 50 |  | 800 | 225 | 66 | 100 | 37 | −85E | 50.5 | 148.9 | 6.7 |

As shown in the table above, the 80° F. tensile strength is improved as the unsaturation value of the hydrogenated elastomer is reduced.

EXAMPLE III

Hydrogenated polybutadiene was prepared according to the following recipe, the polymerization being carried out at 41° F.

|  | Parts by weight |
|---|---|
| Water | 180 |
| 1,3-butadiene | 100 |
| Sodium alkaryl sulfonate | 1.5 |
| Diisopropylbenzene hydroperoxide | 0.097 |
| KOH | 0.04 |
| Potassium pyrophosphate | 0.177 |
| Ferrous sulfate heptahydrate | 0.14 |
| Mixed tertiary mercaptans [1] | 0.65 |

Shortstopped with dinitrochlorobenzene.

[1] A blend of tertiary $C_{12}$, $C_{14}$ and $C_{16}$ aliphatic mercaptans in a ratio of 3:1:1 parts by weight.

250 grams of the polybutadiene as prepared above was dispersed in 4½ liters methylcyclohexane and 500 cc. nickel-kieselguhr catalyst (prepared as in the examples set forth hereinbefore) was added. The resulting mixture was charged to a reactor, and hydrogenation was accomplished with hydrogen at 1370 p. s. i. g., 200° F. and for 4 hours. The catalyst was separated magnetically. The resulting solution was concentrated and hydrogenated material precipitated with isopropanol. The resulting hydrogenated material was dried in vacuo at 150° F. for 15 hours.

The hydrogenated material, which had an unsaturation value of 35.6 percent compared to an original unsaturation value of 94.5 percent, was compounded in a gum recipe and ozone tests made on the vulcanizates. The test strips were rectangular, ½ inch wide and were stretched to 25% elongation. The following results were obtained after 45 hours exposure in an atmosphere containing 51 parts ozone per million parts of air.

| Material | 1 | 2 | 3 | 4 | Total |
|---|---|---|---|---|---|
| Hydrogenated 41° F. polybutadiene gum (unsaturation 35.6%) | 2 | 0 | 0 | 0 | 2 |
| 41° F. unhydrogenated polybutadiene gum control | 7½ | 7½ | 7½ | 7½ | 30 |
| Natural rubber control | 7½ | 7½ | 7½ | 7½ | 30 |

The numbers 1, 2, 3 and 4 are sample numbers, i. e., four different samples were used in each test. The total, an arbitrary figure, was obtained by adding the readings on the four individual samples.

The results were rated according to the numerical system explained below:
(1) Surface slightly dulled.
(2) First evidence of attack, slight "bubbly" appearance on surface.
(3) Roughening of surface, no open cracks.
(4) First appearance of very minute cracks.
(5) Many minute, shallow cracks.
(6) Longer shallow cracks.
(7) Deeper cracking, numerous, appearance of very fine tight lace.
(8) More serious cracking, growing quite deep.
(9) Lacework of deep cracks.
(10) Cracks both deep and numerous.

Samples rated by this system furnish a quantitative measure of cracking. A smaller number indicates a better rating. Results of this test show hydrogenated polybutadiene to be remarkably superior to both unhydrogenated polybutadiene and natural rubber as concerns resistance to cracking in an atmosphere containing ozone.

A reference to the ozone tests will be found in the Vanderbilt 1948 Rubber Handbook, pages 476–481.

EXAMPLE IV

In order to show the effect of varying Mooney viscosity upon the hydrogenated polybutadiene, the evaluation data of three hydrogenated polymers of 40 percent unsaturation prepared from polybutadienes of 12, 26, and 32 Mooney viscosity are presented in this example. The results indicate that as the Mooney of the base stock increases the stress strain properties and the resistance to swelling are improved and the ozone resistance is slightly improved. The processing of the hydrogenated polymers becomes more difficult with increasing Mooney of the base stock. These polymers were prepared in a standard 41° F. emulsion polymerization system and were hydrogenated at 350° F. Data on the unhydrogenated and hydrogenated stocks (both compounded in a titanium dioxide recipe) are reproduced in the following table and a further comparison is made wherein the 26 Mooney polymer was hydrogenated to a residual unsaturation of 7.1 percent.

TABLE I

| Iden. No. | | Unsaturation, percent | Stress-Strain 80° F. | | | 200° F. | | Ozone Rating |
|---|---|---|---|---|---|---|---|---|
| | | | 300% Modulus | Tensile, p. s. i. | Percent Elongation | Tensile, p. s. i. | Percent Volume Swell | |
| I | 12 Mooney Polybutadiene | 92.1 | | 170 | 525 | 20 | 283.3 | 8.5 |
| II | 26 Mooney Polybutadiene | 94.8 | | 240 | 275 | 40 | 249.5 | 9.0 |
| III | 32 Mooney Polybutadiene | 93.2 | | 240 | 255 | 80 | 255.4 | 8.5 |
| IV | Hydrogenated I | 40.0 | 400 | 430 | 350 | 20 | 238.9 | 7.5 |
| V | Hydrogenated II | 40.0 | 710 | 980 | 410 | 140 | 182.4 | 6.5 |
| VI | Hydrogenated III | 40.0 | 1,040 | 1,120 | 330 | 150 | 153.8 | 6.0 |
| VII | Hydrogenated II | 7.1 | 860 | 2,990 | 740 | 40 | 59.9 | 0 |

EXAMPLE V

Polymers prepared at different polymerization temperatures have been hydrogenated to determine the temperatures at which superior hydrogenated materials might be obtained. As a result of this work it is shown that the hydrogenated product prepared from 41° F. polybutadiene possesses the best balance of physical properties and is definitely superior in tensile strength and swell in a 70/30 isooctane-toluene solution to materials prepared from base stocks polymerized at higher polymerization temperature. The data represent the properties of the uncompounded stocks.

TABLE II

| Original Rubber | Unsaturation, percent | Shore Hardness | Flex[a] temp., °F. | Swell percent[b] | 80° F. | | Cold Compression Set, percent | | Gehman Freeze Pt., °C. |
|---|---|---|---|---|---|---|---|---|---|
| | | | | | Tensile, p. s. i. | Elongation, percent | Relaxed, 10 sec. | Relaxed, 30 min. | |
| 86° F., 20 Mooney Polybutadiene | 14.0 | 81 | −83.0 | 266.0 | 880 | 825 | 97.7 | 95.3 | −58 |
| 122° F., 19 Mooney Polybutadiene | 9.5 | 85 | −83.0 | 195.8 | 800 | 805 | 97.1 | 95.9 | −51 |
| 41° F., 20 Mooney Polybutadiene | 9.3 | 83 | −93.0 | 133.0 | 1,170 | 800 | 95.0 | 93.0 | −52.0 |
| 41° F., 20 Mooney Polybutadiene | 2.7 | 88 | −79.0 | 74.1 | 1,650 | 735 | 94.8 | 93.4 | −52.0 |

[a]Temperature at which the modulus of elasticity equals 135,000 p. s. i.
[b]72-Hours in 70/30 isooctane-toluene mixture at room temperature.

While polymers produced at 0° F. can be hydrogenated, they are more difficult to process and to hydrogenate than the polymers prepared at 41° F., and, temperatures of the order of 41° F. are believed to be the most practical.

EXAMPLE VI

Hydrogenation of polybutadiene has been carried out at many different temperatures and it has been found that hydrogenation is much more effective at higher temperatures in that hydrogenation to a given value can be accomplished with considerably less catalyst. For example, hydrogenation of a sample of 41° F. polybutadiene at 500° gave a hydrogenated material of lower unsaturation than was obtained upon hydrogenation of a sample of the same polymer at 350° F. using eight times as much catalyst, other conditions being maintained constant. Determinations of kinematic viscosities of toluene solutions prepared at the higher temperatures indicated that there is very little, if any, degradation of the polymer at hydrogenation temperatures up to 500° F. Furthermore, it has been found that polymers polymerized at higher temperatures required higher temperatures using the same amount of catalyst and same length of time to effect the same degree of hydrogenation.

EXAMPLE VII

A series of runs were made to illustrate the effect of varying the temperature upon the hydrogenation reaction. In these runs a 41° F., 20 Mooney polybutadiene was hydrogenated using 0.12 gram nickel-kieselguhr catalyst prepared according to one preferred method per gram of polybutadiene at temperatures of 350° F., 450° F., 500° F., and at 500 p. s. i. g., for several hours. During the reaction, samples of the hydrogenated polymer were removed and the unsaturation of these materials was determined. The results are shown in the following table.

TABLE III

| Reaction Time, Hours | Unsaturation, Percent | | |
|---|---|---|---|
| | 350° F. | 450° F. | 500° F. |
| 0 | 94.9 | 94.9 | 94.9 |
| 1 | 49.6 | 45.1 | |
| 2 | 48.8 | 24.6 | |
| 2.25 | | | 15.2 |
| 3 | 38.4 | 17.4 | |
| 3.5 | | | 10.3 |
| 4 | 38.2 | 15.5 | |
| 4.5 | | | 6.6 |
| 5 | 37.1 | 12.7 | |
| 5.5 | | | 4.8 |
| 6 | 32.0 | 11.9 | |
| 6.5 | | | 3.8 |
| 7 | | 10.6 | |

These data show that the hydrogenation proceeds rapidly during the first part of the reaction, becoming less rapid with small amounts of hydrogenation occurring after the three hour reaction period. Since there appears to be no degradation of the polymer at the higher temperatures, these temperatures are to be preferred.

EXAMPLE VIII

The superiority of the nickel-kieselguhr catalyst has been demonstrated by comparing this catalyst with other well known hydrogenation catalysts. In the following runs the catalysts requiring activation with hydrogen (this includes all the catalysts tested except the copper chromite catalysts) were reduced in an 0.5 inch glass tube with an approximate hydrogen flow rate of 850 volumes per volume of the catalyst. The molybdenum sulfide catalyst was reduced at 800° F., whereas the others were reduced at 675° F. Using the various catalysts, a 41° F., 20 Mooney polybutadiene was hydrogenated to produce hydrogenated polybutadiene. The results of these runs are shown in the following table.

TABLE IV

| Catalyst | Mesh Size | Catalyst, Grams/gram of Polybutadiene | Solvent | Temperature, °F. | Unsaturation, percent |
|---|---|---|---|---|---|
| Copper Chromite | | 0.2 | Methylcyclohexane | 500 | 64 |
| Do | | 0.2 | Decalin | 600 | d 48 |
| Nickel-Alumina | | 0.1 | Methylcyclohexane | 500 | 32 |
| Unsupported Nickel | | 0.1 | do | 500 | 80 |
| Nickel-Copper-Pumice | through 100 | 0.6 | do | 500 | 25 |
| Nickel-Kieselguhr a | through 200 c | 0.1 | do | 500 | 77 |
| Do.a | 100-200 | 0.1 | do | 500 | 71 |
| Do.a | 50-100 | 0.1 | do | 500 | 73 |
| Do.a | 20-50 | 0.1 | do | 500 | 77 |
| Do | (b) | 0.1 | do | 500 | 4 |
| Do | (b) | 0.05 | do | 500 | 21 |
| Molybdenum Sulfide | through 100 | 0.1 | do | 500 | 89 | a Crushed from ⅛" pills.
b 4 to 8 microns.
c Smaller than 74 microns.
d A liquid product.

EXAMPLE IX

Various nickel-kieselguhr catalysts have been used to illustrate the effect of the reduced nickel content upon the residual unsaturation of the polymer following hydrogenation. These catalysts were evaluated by hydrogenating a 41° F. 20 Mooney polybutadiene at 350° F. and 500 p. s. i. g. in a batchwise reactor. The results are shown in the following table.

TABLE V

| Run No. | Reduced Nickel-Polymer Ratio,a Grams/Gram | Unsaturation, Percent |
|---|---|---|
| B-132 | 0.069 | 8.8 |
| B-136 | 0.055 | 27.2 |
| B-164 | 0.039 | 32.0 |
| B-168 | 0.071 | 6.3 |
| B-169 | 0.061 | 14.6 |
| B-170 | 0.051 | 24.5 |
| B-171 | 0.061 | 12.6 |
| B-172 | 0.051 | 23.2 |
| B-174 | 0.064 | 6.4 |
| B-175 | 0.041 | 39.5 |
| B-176 | 0.041 | 27.4 |
| B-177 | 0.047 | 25.8 | a Ratio equals weight of catalyst times the fraction of reduced nickel divided by the weight of the polymer.

EXAMPLE X

In order to demonstrate the effect of various chemicals on hydrogenated polybutadiene under stress, pieces cut from molded sheets were immersed in a variety of liquid chemicals and in a 10 percent water solution of certain solid, water soluble chemicals. Semi-solid materials were coated onto the polymer. Non-volatile compounds were exposed at 131° F. and the volatile compounds were tested at room temperature. The hydrogenated material had a residual unsaturation of 8.9 percent and the observations were made at the end of 36 days. The data are recorded in the following table.

TABLE VI

| Compound | Hydrogenated Polybutadiene |
|---|---|
| Methanol | not cracked. |
| Toluene | Do. |
| Dibutyl sebacate | Do. |
| Mineral oil | dissolved. |
| Glycerol | not cracked. |
| Soap | Do. |
| Detergent | Do. |
| Sodium Hydroxide | Do. |
| Silicone | Do. |
| Acetic Acid | Do. |
| Water | Do. |
| Paraffin | Do. |
| Sodium Chloride | Do. |
| Linseed oil | Do. |
| Triethanol amine | Do. |
| Diethylene glycol monobutyl ether | Do. |
| Hexane | Do. |
| Bentonite | Do. |
| Ammonium Sulfate | Do. |
| Liquid Polybutadiene | Do. |
| Asphalt | cracked. |

EXAMPLE XI

Polybutadiene was prepared in a 41° F. polymerization system to produce a 20 Mooney polymer. The recipe was as follows:

|  | Parts |
|---|---|
| Water | 180 |
| Butadiene | 125 |
| Santomerse (Na alkaryl sulfonate) | 1.25 |
| Potassium pyrophosphate | 0.177 |
| $Fe(SO_4)_2 \cdot 7H_2O$ | 0.14 |
| Diisopropylbenzene hydroperoxide | 0.107 |
| Tert-dodecyl mercaptan | 0.15 |

The polymerization was shortstopped with 0.2 parts di-tert-butyl* hydroquinone and an anti-oxidant was added. The conversion reached 63 percent at a time of 17 hours, the resulting polymer having an unsaturation of 94.9 percent. This polymer was flexible at −108° F.

A portion of this polybutadiene was hydrogenated at 490° F. and 500 p. s. i. g. using 0.11 gram of nickel kieselguhr catalyst per gram of polybutadiene. After three hours at the operating temperature, the hydrogenated material having an unsaturation of 14.7 percent was recovered. This material was compounded in the following recipe:

|  | Parts |
|---|---|
| Hydrogenated polybutadiene | 100 |
| Titanium dioxide | 100 |
| Zinc oxide | 5 |
| Agerite alba [1] | 1 |
| Stearic acid | 2 |
| Sulfur | 2 |
| Santocure | 1 |
| A-32 [2] | 0.2 |
| Ultramarine blue | 0.02 |

[1] Hydroquinone monobenzyl ether-anti-oxidant.
[2] Reaction product of butyraldehyde.

The curing time was 45 minutes at 307° F. and the compounded stock had a tensile of 1690 p. s. i., an elongation of 550 percent, an ozone rating of 0, and was flexible at −108° F.

EXAMPLE XII

A 23 Mooney 41° F. 85/15 butadiene styrene copolymer was prepared according to the following recipe:

|  | Parts |
|---|---|
| Water | 180 |
| Butadiene | 85 |
| Styrene | 15 |
| Sodium salt of a fatty acid soap | 4.5 |
| Potassium pyrophosphate | 0.119 |
| $Fe(SO_4)_2 \cdot 7H_2O$ | 0.10 |
| Diisopropylbenzene hydroperoxide | 0.077 |
| Tert-dodecyl mercaptan | 0.3 |
| KOH | 0.1 |
| KCl | 0.25 |
| Daxad 11 [1] | 0.1 |

[1] Sodium alkylnaphthalene sulfonate.

The polymer was shortstopped with 0.2 part di-tert-butylhydroquinone and an anti-oxidant† was added, the average conversion being 59 percent. This product was hydrogenated at 400° F. and 500 p. s. i. using 25 percent by weight of the nickel kieselguhr catalyst. The uncompounded stock, having 4.4 percent residual unsaturation, had a tensile strength of 2190 p. s. i., an elongation of 720 and a percent swell of 179.4 percent. The flex temperature was −80° F., the softening point was 160° F. and the gehman increase point was −55° F. The material was flexible at −108° F.

* 2,2′-methylenebis(4-methyl-6-tert-butylphenol).
† Bis(nonylphenyl)phosphite.

As will be evident to those skilled in the art, various modifications of this invention can be made, or followed, in the light of the foregoing disclosure and discussion, without departing from the spirit or scope of the disclosure or from the scope of the claims.

We claim:

1. A process for producing thermoplastic materials which comprises, admixing (A) a substantially gel free rubbery homopolymer of butadiene having a Mooney viscosity (ML–4) of 10 to 40, said polymer having been prepared by an emulsion polymerization process at a temperature of 20° F. to 60° F., and subsequently dried in an inert atmosphere at a temperature below 150° F.; (B) a solvent and disperser for said polybutadiene; and (C) 10 to 15 percent by weight based on said polybutadiene of a nickel-kieselguhr catalyst having a particle size of 1 to 8 microns and which has been activated by contact with hydrogen at a temperature of 500 to 800° F.; contacting the mixture with hydrogen for 2 to 8 hours at a temperature of 400 to 600° F. at a pressure of 400 to 600 p. s. i. g., to a residual unsaturation of less than 30 percent; and recovering the resulting plastic material.

2. A thermoplastic material comprising a hydrogenated polymeric material selected from the group consisting of homopolymers of butadiene and copolymers of butadiene containing not over 30 percent by weight of styrene which is characterized by the following properties, the physical properties being measured upon the uncompounded stock: residual unsaturation of less than 50 percent, a tensile strength of at least 1000 p. s. i. at 80° F., an elongation of at least 500 percent at 80° F., flexibility at −100° F., and no second order transition temperature above −256° F.

3. The material of claim 2 in which said polymeric material is polybutadiene.

4. The material of claim 2 in which said polymeric material is a copolymer of polybutadiene containing not over 30 percent by weight of styrene.

5. The material of claim 2, said material having been formed into sheet stock and vulcanized.

6. The material of claim 2 wherein the residual unsaturation is less than 30 percent.

7. A process for producing thermoplastic materials which comprises, admixing (A) a substantially gel-free rubbery material selected from the group consisting of homopolymers of buadiene and copolymers of butadiene containing not over 30 percent by weight of styrene, said polymeric material having been prepared by an emulsion polymerization process at a temperature of −5 to 140° F. and having a Mooney viscosity (ML–4) of 10 to 40, said polymeric material having been dried at a temperature below 150° F.; (B) a solvent and disperser for said polymeric material; and (C) 2 to 30 percent by weight based on said polymeric material of a nickel-kieselguhr catalyst having a particle size of 1 to 8 microns and which has been activated by contact with hydrogen at a temperature of 500 to 800° F.; contacting the mixture with hydrogen for 1 to 24 hours at a temperature of 75 to 1000° F. at a pressure of atmospheric to 3000 p. s. i. g., to a residual unsaturation of less than 50 percent; and recovering the resulting plastic material.

8. A process for producing thermoplastic materials which comprises, admixing (A) a substantially gel-free rubbery material selected from the group consisting of homopolymers of butadiene and copolymers of butadiene containing not over 30 percent by weight of styrene, said polymeric material having been prepared by an emulsion polymerization process at a temperature of 20 to 60° F. and having a Mooney viscosity (ML–4) of 10 to 40, said polymeric material having been dried at a temperature below 150° F.; (B) a solvent and disperser for said polymeric material; and (C) 2 to 30 percent by weight based on said polymeric material of a nickel-kieselguhr catalyst having a particle size of 1 to 8 microns and which has been activated by contact with hydrogen at a temperature of 500 to 800° F.; contacting the mixture with hydrogen for 2 to 8 hours at a temperature of 400 to 600° F. at a pressure of 400 to 600 p. s. i. g., to a residual unsaturation of less than 50 percent; and recovering the resulting plastic material.

References Cited in the file of this patent

UNITED STATES PATENTS

| | | |
|---|---|---|
| 2,046,160 | Graves | June 30, 1936 |
| 2,046,257 | Flint | June 30, 1936 |
| 2,449,949 | Morris et al. | Sept. 21, 1948 |

UNITED STATES PATENT OFFICE

CERTIFICATE OF CORRECTION

Patent No. 2,864,809                          December 16, 1958

Rufus V. Jones et al.

It is hereby certified that error appears in the printed specification of the above numbered patent requiring correction and that the said Letters Patent should read as corrected below.

Column 1, line 23, for "preferablyt" read -- preferably --; column 11, line 12, strike out the asterisk after "tert-butyl" and insert same after "anti-oxidant" in same line.

Signed and sealed this 9th day of June 1959.

(SEAL)
Attest:

KARL H. AXLINE                                     ROBERT C. WATSON
Attesting Officer                                  Commissioner of Patents